United States Patent
Omi

(10) Patent No.: US 12,262,150 B2
(45) Date of Patent: Mar. 25, 2025

(54) DATA TRANSMITTER AND METHOD FOR DATA TRANSMISSION

(71) Applicants: TOYOTA JIDOSHA KABUSHIKI KAISHA, Toyota (JP); AISIN CORPORATION, Aichi (JP)

(72) Inventor: Takuhiro Omi, Anjo (JP)

(73) Assignees: TOYOTA JIDOSHA KABUSHIKI KAISHA, Toyota (JP); AISIN CORPORATION, Aichi (JP)

(*) Notice: Subject to any disclaimer, the term of this patent is extended or adjusted under 35 U.S.C. 154(b) by 0 days.

(21) Appl. No.: 18/408,875

(22) Filed: Jan. 10, 2024

(65) Prior Publication Data

US 2024/0333882 A1 Oct. 3, 2024

(30) Foreign Application Priority Data

Mar. 30, 2023 (JP) ................. 2023-055183

(51) Int. Cl.
*H04N 7/18* (2006.01)
*G06V 20/58* (2022.01)
(52) U.S. Cl.
CPC ............ *H04N 7/183* (2013.01); *G06V 20/58* (2022.01); *G06V 2201/08* (2022.01)
(58) Field of Classification Search
CPC .. G06V 20/582; G06V 20/584; G06V 20/588; G06V 20/586; G06V 20/58; G06V 20/597; G06V 10/806; G06V 2201/08; G06V 2201/07; H04N 7/183; H04N 7/185; H04N 7/181; G05D 1/0088; B60W 60/0016; B60W 50/14; B60W 2540/229; G06T 2207/30261; G06T 2207/30252; G06T 2207/30248

USPC ......................................................... 348/148
See application file for complete search history.

(56) References Cited

U.S. PATENT DOCUMENTS

| 12,029,156 B1* | 7/2024 | Simpson ............. A01D 34/008 |
| 2020/0180657 A1* | 6/2020 | Iwamoto ................ G06V 20/58 |
| 2020/0209851 A1* | 7/2020 | Iwamoto ............. G05D 1/0088 |

FOREIGN PATENT DOCUMENTS

| JP | 10210440 A | 8/1998 |
| JP | 2006254055 A | 9/2006 |
| JP | 2016213791 A | 12/2016 |
| JP | 2019195121 A | 11/2019 |

* cited by examiner

*Primary Examiner* — Nathnael Aynalem
(74) *Attorney, Agent, or Firm* — Dickinson Wright, PLLC

(57) ABSTRACT

A data transmitter is to be mounted on an autonomous driving vehicle. The data transmitter determines whether a confidence score indicating the degree of reliability of detection of the object from the area image is greater than a predetermined confidence score threshold; transmits, when the confidence score regarding the area image is greater than the confidence score threshold, the area image or a face image representing the face of a driver to a terminal, together with a first setting for displaying the area image or the face image on the terminal in first mode; and transmits, when the confidence score is less than the confidence score threshold, the area image to the terminal, together with a second setting for displaying the area image on the terminal in second mode that draws more attention of a user of the terminal than the first mode.

4 Claims, 5 Drawing Sheets

DATA TRANSMITTER AND METHOD FOR DATA TRANSMISSION

FIELD

The present disclosure relates to a data transmitter and a method for data transmission to a terminal via a communication network.

BACKGROUND

Japanese Unexamined Patent Publication No. 2019-195121 (hereafter "Patent Literature 1") describes an information processing device used for a conference call among participants in different locations. The information processing device described in Patent Literature 1 estimates a load of work other than a conference call performed in parallel with the conference call by a participant in the conference call, and informs other participants in the conference call of information on the estimated load. The information processing device described in Patent Literature 1 can prevent a heavy load of driving a vehicle from being further increased by a conference call, when a driver of the vehicle participates in the conference call.

SUMMARY

In a vehicle driven by a level of autonomous driving in which the driver need not be alert, e.g., level 3 autonomous driving defined by the Society of Automotive Engineers (SAE), the driver is released from driving and can do secondary activities, such as videoconferencing, watching television, and using a smartphone.

A change in surrounding environment may cause the level of autonomous driving applied to travel control of a vehicle to change, for example, to a level in which the driver is alert, e.g., level 2 autonomous driving defined by SAE. In a vehicle driven by a level of autonomous driving in which the driver is alert, the driver is required to be alert to driving conditions and to drive the vehicle as necessary.

During a secondary activity, a driver is unlikely to become aware of danger in the surroundings that causes a change of travel control of a vehicle from a level of autonomous driving in which the driver need not be alert to another level of autonomous driving in which the driver needs to be alert. A driver who worries about such a change in the level of autonomous driving may repeat an action such as a check on the surroundings, in case of a change in the level of autonomous driving.

It is an object of the present disclosure to provide a data transmitter that can make it easier for a driver of a vehicle traveling by autonomous driving to become aware of danger during a secondary activity.

The following is a summary of the present disclosure.

(1) A data transmitter to be mounted on a vehicle driven so that the distance between the vehicle and an object detected from an area image representing the surroundings of the vehicle is not less than a predetermined distance threshold, the data transmitter including a processor configured to:
  determine whether a confidence score indicating the degree of reliability of detection of the object from the area image is greater than a predetermined confidence score threshold;
  transmit, when the confidence score is greater than the confidence score threshold, the area image or an image other than the area image to a terminal communicably connected via a communication network, together with a first setting for displaying the image on the terminal in first mode, and
  transmit, when the confidence score is less than the confidence score threshold, the area image to the terminal, together with a second setting for displaying the image on the terminal in second mode that draws more attention of a user of the terminal than the first mode.

(2) The data transmitter according to (1), wherein when the confidence score is less than the confidence score threshold, the processor in transmission further transmits travel information including the speed of the vehicle to the terminal.

(3) A method for data transmission executed by a data transmitter mounted on a vehicle driven so that the distance between the vehicle and an object detected from an area image representing the surroundings of the vehicle is not less than a predetermined distance threshold, the method including:
  determining whether a confidence score indicating the degree of reliability of detection of the object from the area image is greater than a predetermined confidence score threshold;
  transmitting, when the confidence score is greater than the confidence score threshold, the area image or an image other than the area image to a terminal communicably connected via a communication network, together with a first setting for displaying the image on the terminal in first mode; and
  transmitting, when the confidence score is less than the confidence score threshold, the area image to the terminal, together with a second setting for displaying the image on the terminal in second mode that draws more attention of a user of the terminal than the first mode.

(4) A non-transitory computer-readable medium storing a computer program for data transmission causing a computer mounted on a vehicle to execute a process, the vehicle being driven so that the distance between the vehicle and an object detected from an area image representing the surroundings of the vehicle is not less than a predetermined distance threshold, the process including:
  determining whether a confidence score indicating the degree of reliability of detection of the object from the area image is greater than a predetermined confidence score threshold;
  transmitting, when the confidence score is greater than the confidence score threshold, the area image or an image other than the area image to a terminal communicably connected via a communication network, together with a first setting for displaying the image on the terminal in first mode; and
  transmitting, when the confidence score is less than the confidence score threshold, the area image to the terminal, together with a second setting for displaying the image on the terminal in second mode that draws more attention of a user of the terminal than the first mode.

The data transmitter according to the present disclosure can make it easier for a driver of a vehicle traveling by autonomous driving to become aware of danger during a secondary activity.

DESCRIPTION OF EMBODIMENTS

A data transmitter that can make it easier for a driver of a vehicle traveling by autonomous driving to become aware of danger during a secondary activity will now be described in detail with reference to the attached drawings. The data transmitter is to be mounted on a vehicle driven so that the distance between the vehicle and an object detected from an area image representing the surroundings of the vehicle is not less than a predetermined distance threshold. The data transmitter determines whether a confidence score indicating the degree of reliability of detection of the object from the area image is greater than a predetermined confidence score threshold. When the confidence score is greater than the confidence score threshold, the data transmitter transmits the area image or a face image representing the face of a driver to a terminal communicably connected via a communication network, together with a first setting for displaying the image on the terminal in first mode. When the confidence score is less than the confidence score threshold, the data transmitter transmits the area image to the terminal, together with a second setting for displaying the image on the terminal in second mode that draws more attention of a user of the terminal than the first mode.

Figure 1:
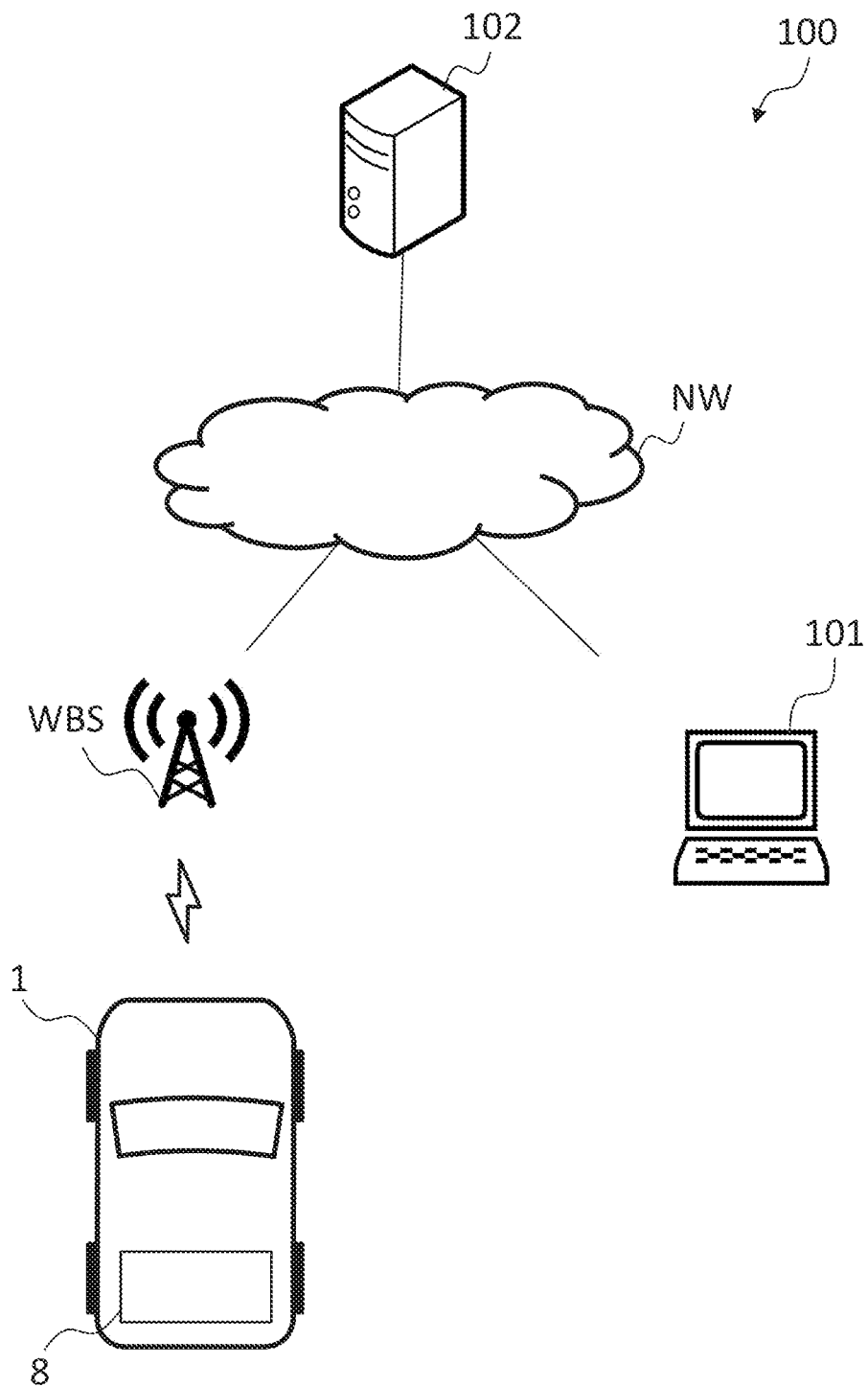
FIG. 1 schematically illustrates the configuration of a videoconference system.

FIG. 1 schematically illustrates the configuration of a videoconference system. The videoconference system 100 includes a terminal 101, a videoconference server 102, and a vehicle 1 equipped with a data transmitter 8.

The terminal 101 is communicably connected to the videoconference server 102 via a communication network. The terminal 101 and the videoconference server 102 are each a computer including a communication interface, a memory, and a processor. The configuration of the data transmitter 8 will be described below.

The vehicle 1 accesses a wireless base station WBS, which is connected to the communication network NW, for example, via a gateway (not illustrated), thereby communicably connecting to the videoconference server 102 via the wireless base station WBS and the communication network NW.

The data transmitter 8 of the vehicle 1 transmits display data for displaying a predetermined image on the terminal 101 to the videoconference server 102 via the communication network NW. The videoconference server 102 transmits display data received from the vehicle 1 to the terminal 101 via the communication network NW. The terminal 101 displays the predetermined image on its display, based on display data received from the videoconference server 102.

Similarly, display data transmitted from the terminal 101 via the videoconference server 102 to the vehicle 1 may be displayed in the vehicle 1. In addition to display data, voice data may be transmitted and received between the terminal 101 and the vehicle 1. Alternatively, the videoconference system 100 may be configured so that the terminal 101 and the data transmitter 8 transmit and receive data via the communication network NW without the videoconference server 102.

Figure 2:
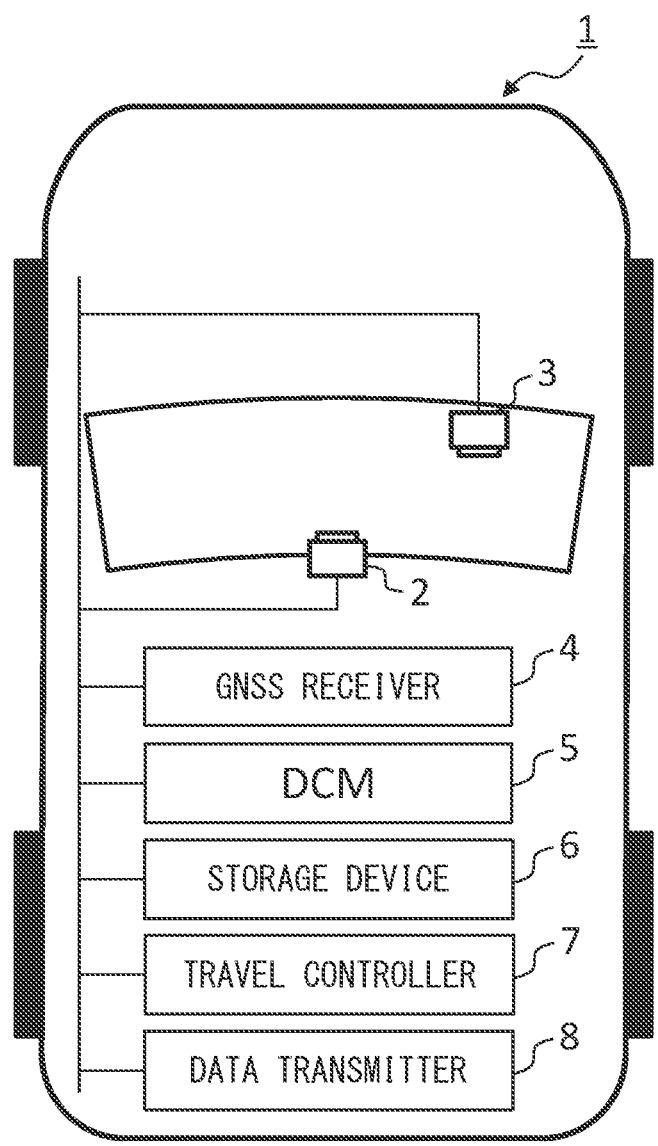
FIG. 2 schematically illustrates the configuration of a vehicle equipped with a data transmitter.

FIG. 2 schematically illustrates the configuration of the vehicle 1 equipped with the data transmitter.

The vehicle 1 includes a surrounding area camera 2, a driver monitoring camera 3, a global navigation satellite system (GNSS) receiver 4, a data communication module (DCM) 5, a storage device 6, and a travel controller 7, in addition to the data transmitter 8. The surrounding area camera 2, the driver monitoring camera 3, the GNSS receiver 4, the data communication module 5, and the storage device 6 are communicably connected to the travel controller 7 and the data transmitter 8 via an in-vehicle network conforming to a standard such as a controller area network. The travel controller 7 is also communicably connected to the data transmitter 8 via the in-vehicle network.

The surrounding area camera 2 is an example of a surrounding area sensor that generates surrounding area data representing the surroundings of the vehicle 1. The surrounding area camera 2 includes a two-dimensional detector constructed from an array of optoelectronic transducers, such as CCD or C-MOS, having sensitivity to visible light and a focusing optical system that forms an image of a target region on the two-dimensional detector. The surrounding area camera 2 is disposed, for example, in a front upper area in the vehicle interior and oriented forward. The surrounding area camera 2 takes a picture of the surroundings of the vehicle 1 through a windshield every predetermined capturing period (e.g., 1/30 to 1/10 seconds), and outputs area images representing the surroundings as surrounding area data. As a surrounding area sensor, the vehicle 1 may include a sensor other than the surrounding area camera 2, e.g., a light detection and ranging (LiDAR) sensor that generates a range image whose pixels each have a value depending on the distance to an object represented in the pixel, as surrounding area data, based on the surroundings of the vehicle 1.

The driver monitoring camera 3, which is an example of the interior sensor that generates an output signal representing the condition of the driver of the vehicle. The driver monitoring camera 3 includes a two-dimensional detector constructed from an array of optoelectronic transducers, such as CCD or C-MOS, having sensitivity to infrared light, a focusing optical system that forms an image of a target region on the two-dimensional detector, and a light source that emits infrared light. The driver monitoring camera 3 is mounted, for example, in a front area in the vehicle interior and oriented toward the face of the driver sitting on the driver's seat. The driver monitoring camera 3 irradiates the driver with infrared light every predetermined capturing period (e.g., 1/30 to 1/10 seconds), and outputs time-series face images representing the driver's face.

The GNSS receiver 4, which is an example of a position determining sensor, receives GNSS signals from GNSS satellites every predetermined period, and determines the position of the vehicle 1, based on the received GNSS signals. The GNSS receiver 4 outputs a positioning signal indicating the result of determination of the position of the vehicle 1 based on the GNSS signals to the data transmitter 8 via the in-vehicle network every predetermined period.

The data communication module 5, which is an example of a vehicle communication unit, is a device to execute a wireless communication process conforming to a predetermined wireless communication standard, such as "4G (4th Generation)" or "5G (5th Generation)." The data communication module 5 passes data included in a radio signal received from the videoconference server 102 to the data transmitter 8. Further, the data communication module 5 includes data received from the data transmitter 8 in an uplink radio signal, and transmits the radio signal to the videoconference server 102. The data communication module 5 may be mounted as part of the travel controller 7 or the data transmitter 8.

The storage device 6, which is an example of a storage unit, includes, for example, a hard disk drive or a nonvolatile semiconductor memory. The storage device 6 stores a high-precision map, which includes, for example, information indicating lane lines dividing lanes in a predetermined region represented in the high-precision map.

The travel controller 7, which is an example of an autonomous driving system, is an electronic control unit (ECU) including a communication interface, a memory, and a processor. The travel controller 7 reads out information on lane lines around the position of the vehicle indicated by a positioning signal received from the GNSS receiver 4, from the storage device 6, which stores a high-precision map. The travel controller 7 detects lane lines in the surroundings by inputting an area image received from the surrounding area camera 2 into a classifier, and matches them to lane lines in the high-precision map to identify a lane being traveled by the vehicle 1. The travel controller 7 detects an object in the surroundings, such as a vehicle, by inputting an area image received from the surrounding area camera 2 into a classifier, and generates a trajectory so as to keep a predetermined distance from the object and to keep the lane or change lanes, depending on the circumstances. To travel along the trajectory, the travel controller 7 outputs a control signal to a travel mechanism (not illustrated) of the vehicle 1. The travel mechanism includes, for example, an engine or a motor for powering the vehicle 1, brakes for decelerating the vehicle 1, and a steering mechanism for steering the vehicle 1.

The classifier may be, for example, a convolutional neural network (CNN) including convolution layers connected in series from the input side toward the output side, such as You Only Look Once (YOLO) or Single Shot MultiBox Detector (SSD). A CNN that has been trained with input of a large number of images representing lane lines and objects to be detected, such as pedestrians and vehicles, used as training data operates as a classifier that detects lane lines and an object in an image. For example, the CNN calculates confidence scores indicating how reliably a detection target is represented for various regions in an inputted image. The CNN detects a region where the confidence score of a detection target exceeds a confidence score threshold for detection, as a region representing the detection target. The CNN outputs the confidence score in this region as a confidence score indicating the degree of reliability of this detection.

The travel controller 7 can control travel of the vehicle 1 by a level of autonomous driving in which the driver need not be alert to the surroundings (e.g., level 3 autonomous driving defined by SAE) under a predetermined condition, e.g., a condition that the vehicle speed is within a predetermined range or motion of traffic participants in the surroundings is not complicated. During travel control of the vehicle 1 by such a level of autonomous driving, the driver can do secondary activities other than driving (e.g., videoconferencing, watching television, and using a smartphone).

When the condition of travel control by a level of autonomous driving in which the driver need not be alert to the surroundings is no longer satisfied, the travel controller 7 requests the driver to take over at least some of tasks related to travel of the vehicle 1, such as being alert to the surroundings and controlling the travel mechanism. Thus, a driver who worries that the travel controller 7 may request takeover of a task because of, for example, a change in the surroundings repeats an action such as a check on the surroundings, to keep the state that enables taking over a task. This results in such a driver being unlikely to become aware of danger during a secondary activity.

The data transmitter 8 is an ECU including a communication interface 81, a memory 82, and a processor 83. The data transmitter 8 detects an object from an area image generated by the surrounding area camera 2, outputs a confidence score of this detection, and transmits the area image or another image to the terminal 101 via a data communication module, together with a setting for displaying that is determined depending on the detected confidence score. The travel controller 7 and the data transmitter 8 may be implemented in the same ECU.

Figure 3:
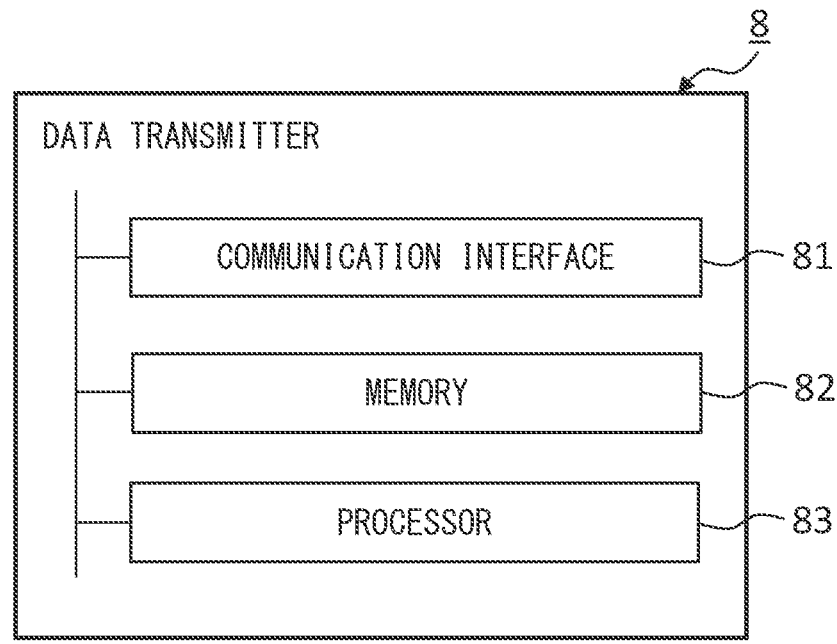
FIG. 3 schematically illustrates the hardware of the data transmitter.

FIG. 3 schematically illustrates the hardware of the data transmitter 8.

The communication interface 81, which is an example of a communication unit, includes a communication interface circuit for connecting the data transmitter 8 to the in-vehicle network. The communication interface 81 provides received data for the processor 83, and outputs data provided from the processor 83 to an external device.

The memory 82 includes volatile and nonvolatile semiconductor memories.

The memory 82 stores various types of data used for processing by the processor 83, e.g., a confidence score threshold for determination about the magnitude of a confidence score of object detection from an area image. The confidence score threshold may be greater than the confidence score threshold for detection used by the travel controller 7 for detecting a detection target from an area image.

The memory 82 also stores a first setting for displaying an area image on the terminal 101 in first mode, and a second setting for displaying an area image on the terminal 101 in second mode that draws more attention of a user of the terminal 101 than the first mode. In the second mode, an area image may be displayed in a size greater than a display size of an area image in the first mode. In the second mode, an area image may be displayed with a more conspicuous outline (e.g., 4.5 points thick and/or yellow) than an outline of an area image in the first mode (e.g., 1.5 points thick and/or blue).

The memory 82 also stores various application programs, e.g., a data transmission program for executing a data transmission process.

The processor 83, which is an example of a control unit, includes one or more processors and a peripheral circuit thereof. The processor 83 may further include another operating circuit, such as a logic-arithmetic unit, an arithmetic unit, or a graphics processing unit.

Figure 4:
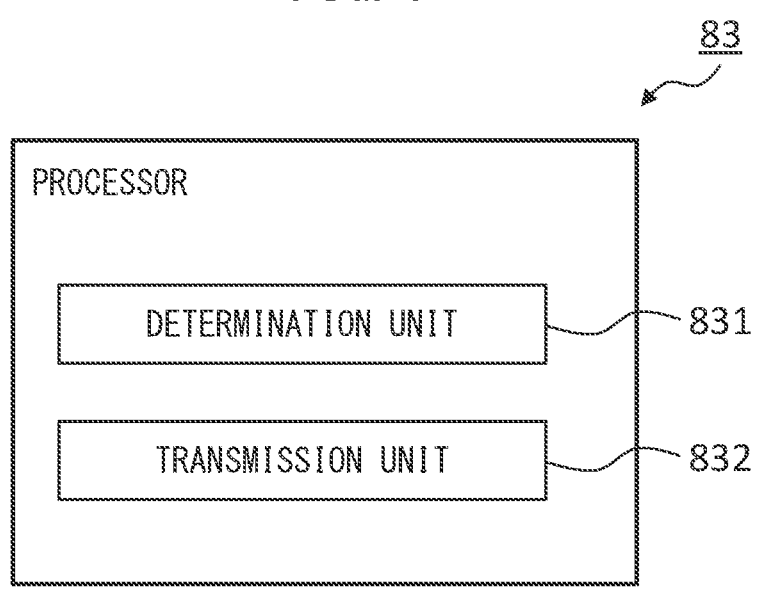
FIG. 4 is a functional block diagram of a processor included in the data transmitter.

FIG. 4 is a functional block diagram of the processor 83 included in the data transmitter 8.

As its functional blocks, the processor 83 of the data transmitter 8 includes a determination unit 831 and a transmission unit 832. These units included in the processor 83 are functional modules implemented by a program executed by the processor 83. The computer program for achieving the functions of the units of the processor 83 may be provided in a form recorded on a computer-readable portable storage medium, such as a semiconductor memory, a magnetic medium, or an optical medium. Alternatively, the units included in the processor 83 may be implemented in the data transmitter 8 as separate integrated circuits, microprocessors, or firmware.

The determination unit 831 determines whether a confidence score indicating the degree of reliability of detection of an object from an area image is greater than the confidence score threshold.

The determination unit 831 obtains, from the travel controller 7, a confidence score of object detection from an area image, and identifies the obtained confidence score as the confidence score of object detection from the area image.

The determination unit 831 may detect an object in the surroundings, such as a vehicle, by inputting an area image generated by the surrounding area camera 2 into a classifier. The classifier may be a CNN trained in advance. At detection of an object, the CNN further outputs a confidence score indicating the degree of reliability of this detection. The determination unit 831 identifies the confidence score, based on the output of the classifier.

The determination unit 831 compares the identified confidence score with the confidence score threshold stored in the memory 82, and determines whether the confidence score is greater than the confidence score threshold.

When the confidence score is greater than the confidence score threshold, the transmission unit 832 transmits the area image or the driver's face image generated by the driver monitoring camera 3, together with a first setting, to the terminal 101 via the communication interface 81, the data communication module 5, and the communication network NW. The transmission unit 832 may determine an image to be transmitted in the case where the confidence score is greater than the confidence score threshold, according to a transmission image setting prestored in the memory 82. The first setting is a setting for displaying the area image or the driver's face image transmitted to the terminal 101 in first mode.

When the confidence score is less than the confidence score threshold, the transmission unit 832 transmits the area image, together with a second setting, to the terminal 101 via the communication interface 81, the data communication module 5, and the communication network NW. The second setting is a setting for displaying the area image on the terminal 101 in second mode that draws more attention of a user of the terminal 101 than the first mode.

Figure 5A:
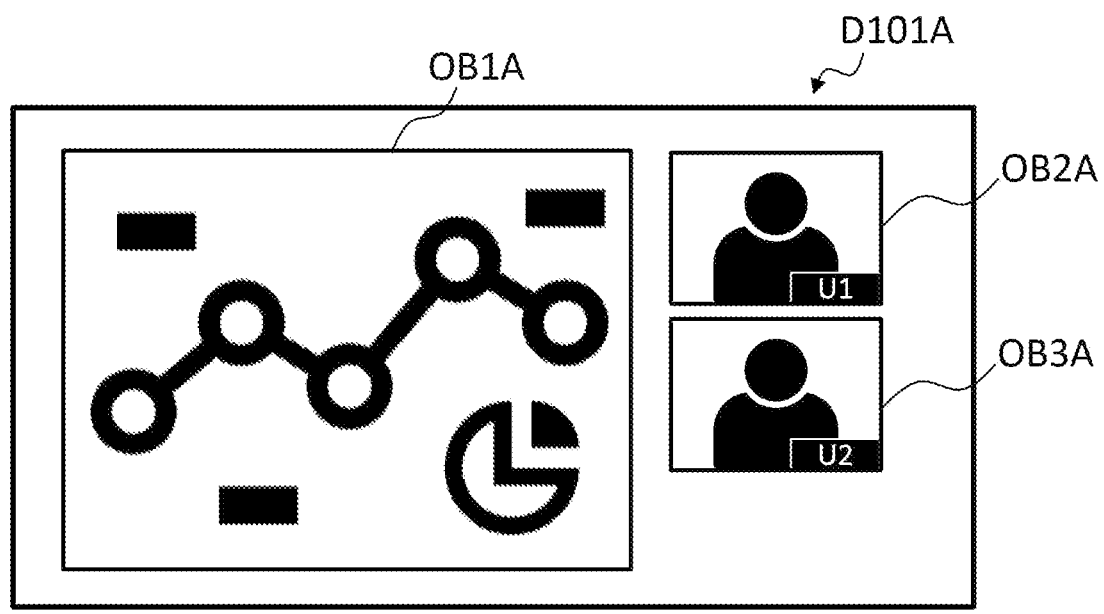
FIG. 5A is an example of a screen displayed on a terminal according to a first setting.
Figure 5B:
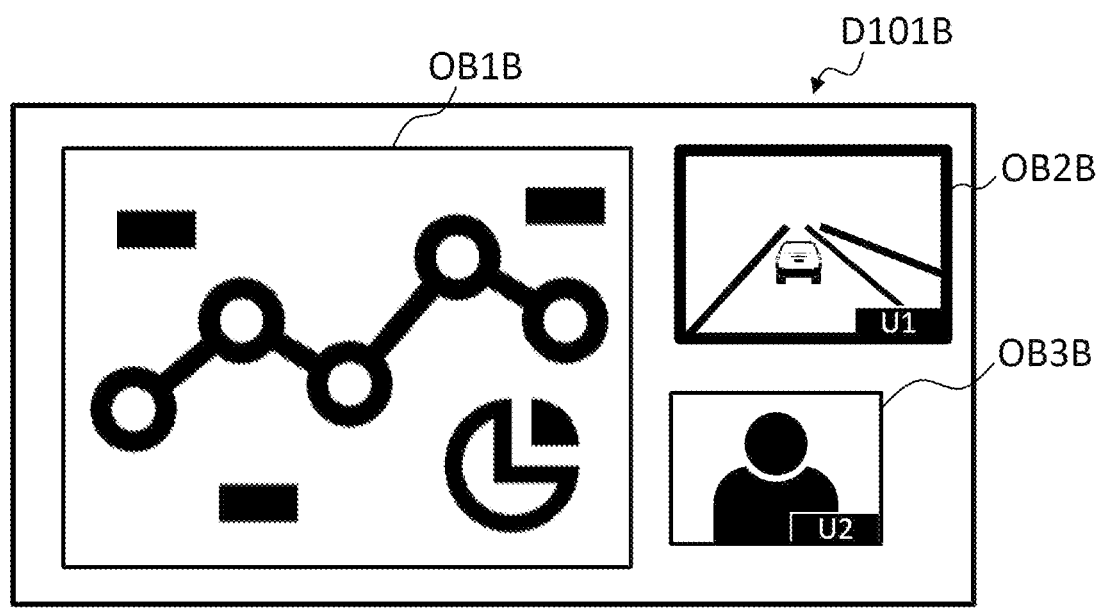
FIG. 5B is an example of a screen displayed on the terminal according to a second setting.

FIG. 5A is an example of a screen displayed on the terminal 101 according to the first setting, and FIG. 5B is an example of a screen displayed on the terminal 101 according to the second setting.

A screen D101A illustrated in FIG. 5A includes objects OB1A, OB2A, and OB3A as displayed objects. The object OB1A is an image generated by application software executed by the terminal 101, and is an example of an application screen object. The object OB2A is a face image representing the face of the driver of the vehicle 1 and generated by the driver monitoring camera 3, and is an example of a participant image object. The object OB3A is a face image representing the face of the user of the terminal 101 and generated by a camera (not illustrated) connected to the terminal 101, and is an example of a participant image object. In the example of FIG. 5A, the transmission image setting prestored in the memory 82 of the data transmitter 8 stipulates that the data transmitter 8 shall transmit the driver's face image when the confidence score is greater than the confidence score threshold. The transmission image setting may stipulate that the data transmitter 8 shall transmit an area image representing the surroundings of the vehicle 1, which is an example of a participant image object, when the confidence score is greater than the confidence score threshold. In this case, the object OB2A is an area image representing the surroundings of the vehicle 1.

The terminal 101 generates the screen D101A in which the objects OB1A-OB3A are disposed according to a standard screen layout, which is one of screen layouts preset by videoconference software, and the first setting, and displays it on its display. For example, the standard screen layout is set so that the application screen object is disposed in an area extending from the upper left of the screen and having 85% of the height and 60% of the width of the whole screen, and that the participant image objects are disposed in order from the upper right toward the lower right of the screen and each have 30% of the height and 25% of the width of the whole screen. Further, the standard screen layout is set so that the application screen object and the participant image objects each have a 1.5-point-thick outline. The first setting specifies that in the generated screen D101A the object OB2A (driver's face image) is to be displayed in a size and with an outline applied to a participant image object in the screen layout used for displaying on the display (first mode). Transmitting an area image or an image other than the area image to the terminal 101 together with the first setting includes transmitting an area image or an image other than the area image to the terminal 101 without specifying display mode.

A screen D101B illustrated in FIG. 5B includes objects OB1B, OB2B, and OB3B as displayed objects. Since the objects OB1B and OB3B are similar to the objects OB1A and OB3A, respectively, detailed description thereof is omitted herein. The object OB2B is an area image representing the surroundings of the vehicle 1 and generated by the surrounding area camera 2.

The terminal 101 generates the screen D101B in which the objects OB1B-OB3B are disposed according to the standard screen layout and the second setting, and displays it on its display. The second setting is set for displaying the area image in a greater (e.g., 1.3 times greater) size and with a thicker (e.g., three times thicker) outline than the size and the outline applied to a participant image object in the screen layout used for displaying on the display (second mode) so that the surroundings of the vehicle 1 draw attention of the user of the terminal 101.

As the screen layout for displaying on the display, the user of the terminal 101 may use a list screen layout in which only a participant list is displayed without a participant image object (with an object displayed in size 0). In the first setting in this case, the driver's face image is not displayed (first mode) according to the list screen layout. In the second setting, since the display size of a participant image object is 0 in the currently used screen layout (list screen layout), the display size of the area image based on the ratio to the display size of the participant image object (e.g., 1.3 times) is 0, and thus cannot be made greater than the size applied to the participant image object. In the second setting in this case, a predetermined size (e.g., the size applied to a participant image object in the standard screen layout) may be used as the display size of the area image.

The transmission unit 832 may transmit the area image or the driver's face image to the terminal 101 via the videoconference server 102. The videoconference server 102 that has received the area image or the driver's face image from the data transmitter 8 transmits the received area image or driver's face image to terminals participating in a predetermined videoconference, which include the terminal 101, via the communication network NW.

When the confidence score is less than the confidence score threshold, the transmission unit 832 may further transmit travel information including the speed of the vehicle to the terminal 101. The transmission unit 832 obtains travel information from the travel controller 7. For example, the transmission unit 832 generates an embedded area image obtained by superposing an image of a character string indicating the travel information on the area image, and transmits the embedded area image to the terminal 101. In this case, the terminal 101 displays the embedded area image on its display to display the travel information. The transmission unit 832 may transmit the travel information, together with the area image, to the terminal 101. In this case, the terminal 101 displays an image of a character string indicating the travel information (e.g., on or near the area image) so that association with the area image can be seen. By transmitting travel information to the terminal 101 in this way, the data transmitter 8 can appropriately inform the terminal 101 of the surroundings of the vehicle 1 traveling by autonomous driving.

Figure 6:
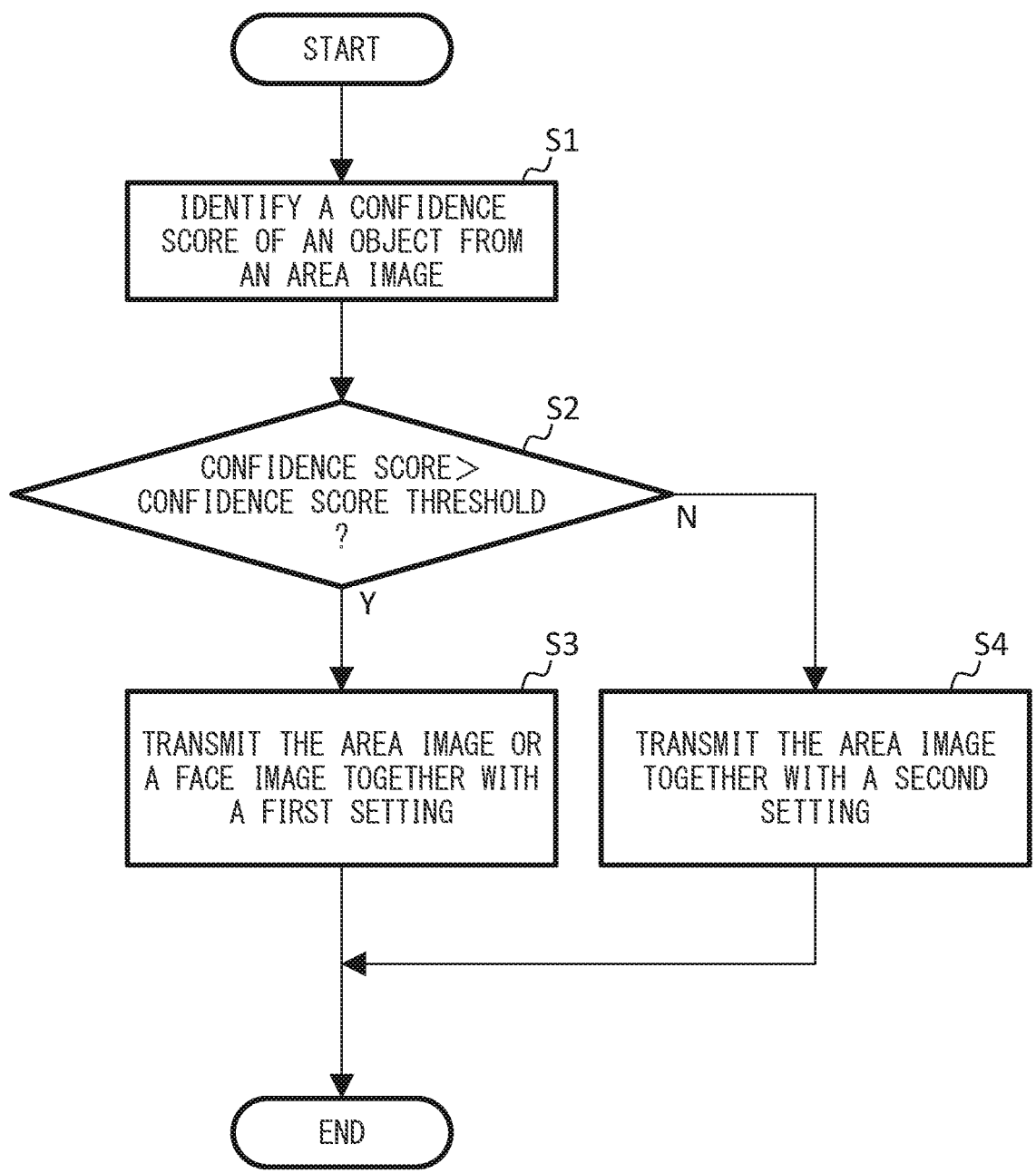
FIG. 6 is a flowchart of a data transmission process.

FIG. 6 is a flowchart of a data transmission process. The processor 83 of the data transmitter 8 executes the data transmission process described below at predetermined intervals (e.g., intervals of 1/30 seconds) while the driver is participating in a videoconference and the vehicle 1 is driven so that the distance between the vehicle 1 and an object detected from an area image is not less than a predetermined distance threshold.

First, the determination unit 831 of the processor 83 of the data transmitter 8 identifies a confidence score indicating the degree of reliability of detection of an object from an area image obtained from the surrounding area camera 2 (step S1).

The determination unit 831 of the processor 83 determines whether the confidence score is greater than a predetermined confidence score threshold (step S2). When the confidence score is greater than the confidence score threshold (Yes in step S2), the transmission unit 832 transmits the area image or the driver's face image to the terminal 101 communicably connected via the communication network NW, together with a first setting for displaying the area image or the face image on the terminal 101 in first mode (step S3), and terminates the data transmission process.

When the confidence score is less than the confidence score threshold (No in step S2), the transmission unit 832 transmits the area image to the terminal 101 communicably connected via the communication network NW, together with a second setting for displaying the area image on the terminal 101 in second mode (step S4), and terminates the data transmission process.

By executing the data transmission process in this way, the data transmitter 8 can appropriately inform the terminal 101 of the surroundings of the vehicle 1 traveling by autonomous driving. For example, when the confidence score of detection of an object from an area image decreases during the driver's videoconference as a secondary activity, the data transmitter 8 transmits the area image to the terminal 101 used by another participant in the videoconference, together with the second setting for displaying the area image in second mode that draws more attention. The participant can look at the area image in second mode and call the driver's attention, using the videoconference, depending on the circumstances of the vehicle 1. Since checking the surroundings can be shared with the participant in the video conference during travel by autonomous driving, the driver is likely to become aware of danger during the secondary activity.

According to a modified example, the confidence score threshold stored in the memory 82 may be less than the confidence score threshold for detection. By executing the data transmission process with such a confidence score threshold, the data transmitter 8 can transmit an area image representing an object that is not appropriately detected by the travel controller 7, to the terminal 101.

According to another modified example, the transmission unit 832 may transmit an area image to the terminal, together with the second setting, when an object about which it is determined that the confidence score of detection from the area image is greater than the confidence score threshold affects continuation of autonomous driving control. In this modified example, the transmission unit 832 transmits an area image or the driver's face image to the terminal, together with the first setting, when an object about which it is determined that the confidence score of detection from the area image is greater than the confidence score threshold does not affect continuation of autonomous driving control. An object that affects continuation of autonomous driving control is, for example, an object approaching the vehicle 1 whereas an object that does not affect continuation of autonomous driving control is, for example, an object moving away from the vehicle 1. By executing the data transmission process in this way, the data transmitter 8 can transmit an area image from which an object that affects continuation of autonomous driving control is detected, to the terminal 101 appropriately.

It should be noted that those skilled in the art can make various changes, substitutions, and modifications without departing from the spirit and scope of the present disclosure.

What is claimed is:

1. A data transmitter to be mounted on a vehicle driven so that a distance between the vehicle and an object detected from an area image representing the surroundings of the vehicle is not less than a predetermined distance threshold, the data transmitter comprising a processor configured to:
   determine whether a confidence score indicating a degree of reliability of detection of the object from the area image is greater than a predetermined confidence score threshold;
   transmit, when the confidence score is greater than the confidence score threshold, the area image or a face image representing the face of a driver of the vehicle to a terminal communicably connected via a communication network, together with a first setting for displaying the area image or the face image on the terminal in first mode; and
   transmit, when the confidence score is less than the confidence score threshold, the area image to the terminal, together with a second setting for displaying the area image on the terminal in second mode that draws more attention of a user of the terminal than the first mode.

2. The data transmitter according to claim 1, wherein when the confidence score is less than the confidence score threshold, the processor further configured to transmit travel information including the speed of the vehicle to the terminal.

3. A method for data transmission executed by a data transmitter mounted on a vehicle driven so that a distance between the vehicle and an object detected from an area image representing the surroundings of the vehicle is not less than a predetermined distance threshold, the method comprising:
   determining whether a confidence score indicating a degree of reliability of detection of the object from the area image is greater than a predetermined confidence score threshold;
   transmitting, when the confidence score is greater than the confidence score threshold, the area image or a face image representing the face of a driver of the vehicle to a terminal communicably connected via a communication network, together with a first setting for displaying the area image or the face image on the terminal in first mode; and transmitting, when the confidence score is less than the confidence score threshold, the area image to the terminal, together with a second setting for displaying the area image on the terminal in second mode that draws more attention of a user of the terminal than the first mode.

4. A non-transitory computer-readable medium storing a computer program for data transmission causing a computer mounted on a vehicle to execute a process, the vehicle being driven so that a distance between the vehicle and an object detected from an area image representing the surroundings of the vehicle is not less than a predetermined distance threshold, the process comprising:

determining whether a confidence score indicating a degree of reliability of detection of the object from the area image is greater than a predetermined confidence score threshold;

transmitting, when the confidence score is greater than the confidence score threshold, the area image or a face image representing the face of a driver of the vehicle to a terminal communicably connected via a communication network, together with a first setting for displaying the area image or the face image on the terminal in first mode; and transmitting, when the confidence score is less than the confidence score threshold, the area image to the terminal, together with a second setting for displaying the area image on the terminal in second mode that draws more attention of a user of the terminal than the first mode.

* * * * *